United States Patent
Matityaho (10) Patent No.: US 9,558,470 B2
(45) Date of Patent: Jan. 31, 2017

(54) SYSTEM AND METHOD FOR MANAGING INVENTORY OF CONSUMABLE ARTICLES

(71) Applicant: LogiTag Systems Ltd., Netanya (IL)

(72) Inventor: Shlomo Matityaho, Tel Mond (IL)

(73) Assignee: LOGITAG SYSTEMS LTD., Netanya (IL)

( * ) Notice: Subject to any disclaimer, the term of this patent is extended or adjusted under 35 U.S.C. 154(b) by 334 days.

(21) Appl. No.: 13/623,191

(22) Filed: Sep. 20, 2012

(65) Prior Publication Data

US 2013/0068833 A1    Mar. 21, 2013

Related U.S. Application Data

(60) Provisional application No. 61/536,623, filed on Sep. 20, 2011.

(51) Int. Cl.
*G06Q 10/08* (2012.01)

(52) U.S. Cl.
CPC .................................. *G06Q 10/087* (2013.01)

(58) Field of Classification Search
CPC .. G06F 19/3462; G07F 17/0092; G07F 9/026; G06Q 10/087; G06Q 20/40145; G06Q 10/08; G07B 15/063; G06K 19/077; G06K 7/0008; G06K 19/0723; B29C 65/00; B29C 47/0021; C08L 97/02; B05C 5/005; B65B 33/00
USPC . 340/4.5, 10.1, 572; 235/375, 385; 428/209, 457
See application file for complete search history.

(56) References Cited

U.S. PATENT DOCUMENTS

2007/0063029 A1\* 3/2007 Brandt et al. ................. 235/385
2009/0000103 A1\* 1/2009 Muhlenkamp et al. ........ 29/428

\* cited by examiner

*Primary Examiner* — Sonji Johnson
(74) *Attorney, Agent, or Firm* — Browdy and Neimark, PLLC (57) ABSTRACT

Restocking cards with machine readable tags are placed on article packaging in a supply room. When an employee wishes to order an article, the employee removes the restocking card from the article packaging and presents the restocking card to a container equipped with a machine readable tag reader. The machine readable tag of the restocking card enables the container to generate an order for a predefined quantity of the identified article. The order is sent to a central stock server which processes the order and sends it to the appropriate fulfillment server.

13 Claims, 5 Drawing Sheets

SYSTEM AND METHOD FOR MANAGING INVENTORY OF CONSUMABLE ARTICLES

CROSS-REFERENCES TO RELATED APPLICATIONS

This application claims the benefit of U.S. Provisional Patent Application No. 61/536,623, filed by Shlomo MATITYAHO, on Sep. 20, 2011 and incorporated herein by reference.

TECHNICAL FIELD

The present invention relates to managing inventory in general and in particular to managing inventory of consumable articles.

BACKGROUND ART

Facilities like storage rooms in hospitals, fast food chains, retail store chains, logistics centers, group of purchasing organizations and the like use large quantities of consumable articles on a daily basis and thus constantly need to track the status of such consumable articles and make sure sufficient quantities of each product are ordered on time so that these articles are always available when needed.

In many cases, the consumable articles are stocked in a plurality of supply rooms in the facility (or in individual retail stores and the like) where they are readily available for use. Those articles are usually not controlled on a per "item level" but on a bulk level, and the usage of the individual article is not reported to the information systems, for example, a package of 100 napkins (or 40 toilet paper rolls) as opposed to tracking napkins or toilet paper rolls individually. As a result, not having usage information for an article can create a situation in which the store room faces Out Of Stock (OOS) situations for an article, including sometimes of critical articles. In order to avoid OOS, the organization typically needs to spend considerable time in counting and creating complex and inefficient reporting mechanisms for inventory control and on-time reordering. The daily counting or replenishment requests are usually sent to the organization's central storage area or logistics center for replenishment. A central supply room (or central storage area) may receive all the orders fulfilled by the different suppliers. The orders are then dispatched from the central supply room/center to the different supply rooms, retail stores etc.

SUMMARY OF INVENTION

It is an object of the present invention to disclose a system and method for managing the reordering point and inventory level of consumable articles.

It is another object of the present invention to disclose a system and method for managing the reordering point and inventory level of consumable articles with no need to manually report to information system the usage of an article.

It is a further object of the present invention to disclose a system and method for managing inventory of consumable and reordering point articles with just in time (JIT) restocking.

It is yet another object of the present invention to disclose a system and method for managing inventory of consumable and reordering point articles with just in time (JIT) and KanBan two bin systems restocking methodology.

It is yet a further object of the present invention to disclose a system and method for managing inventory and reordering point of consumable articles by using existing storeroom shelving.

It is yet another object of the present invention to disclose a system and method for managing inventory of consumable and reordering point articles with low capital investment on existing storage solutions and facility.

It is yet a further object of the present invention to disclose a system of method where an employee can order an item without using a computer system.

It is yet another object of the present invention to disclose a system of method where an employee can immediately recognize if an item has been ordered without using a computer system.

The present invention thus relates to a system for ordering and receiving articles in a supply room of a facility, the system comprising:

(i) a plurality of restocking cards, each restocking card comprising a machine readable tag, and configured to be removably attached to an article packaging and identify a predetermined ordering quantity of said article;

(ii) a plurality of visual cues placed underneath said plurality of stocking cards on said article packaging such that when a restocking card is removed, the visual cue underneath becomes visible and signals that an order has been placed for said article;

(iii) a container comprising a machine tag reader for reading said plurality of restocking cards; and (iv) a central stock server comprising a processor and memory units connected to said container for receiving orders to be fulfilled from the container and transferring said orders to be fulfilled to a fulfillment server, wherein when an employee wishes to order a predetermined quantity of an article the employee removes the restocking card from said article's packaging and presents the restocking card to the container, the container then transmits an order for the quantity and article associated with the restocking card to the central stock server which processes the order and sends it to a fulfillment server.

In some embodiments, the machine readable tag is a passive Radio Frequency Identification (RFID) tag.

In some embodiments, the container comprises two states: one for receiving an order to be fulfilled for a certain quantity of a product, and the other for signaling that an order for a certain quantity of a product has been fulfilled.

In some embodiments, when an order is fulfilled the person delivering the fulfilled product to the supply room verifies that the container is in the state for order fulfillment and presents a stocking card associated with the fulfilled order to the container confirming that an order for a certain quantity of a predetermined article has been fulfilled to the supply room.

In some embodiments, the container is a stock box adapted to withholding a plurality of restocking cards inside the box.

In some embodiments, the container is a stock board adapted to visibly holding a plurality of restocking cards on the board.

In some embodiments, the container is connected to the central stock server via a wired or wireless connection or both.

In some embodiments, the person delivering the fulfilled product to the supply room first identifies himself before presenting the restocking card to the container.

In some embodiments, each restocking card further comprises one or more of the following items: article name, number of units to be ordered, manufacturer name, catalog number, storage location in the supply room, barcode, article description and photo of article.

In some embodiments, the fulfillment server sends orders to a facility server and the facility server sends the orders to the appropriate suppliers.

In some embodiments, the container further comprises a monitor for displaying the contents of a read restocking card.

In some embodiments, the system comprises a second restocking card to signal an urgent order of an article.

In another aspect, the present invention relates to method for ordering and receiving articles in a supply room of a facility, the method comprising the steps of:

(i) configuring a plurality of restocking cards each to identify a predetermined quantity of a predetermined article, each restocking card comprising a machine readable tag and configured to be removably attached to an article packaging and identify a predetermined ordering quantity of said article;

(ii) placing a plurality of visual cues underneath said plurality of stocking cards on said article packaging such that when a restocking card is removed, the visual cue underneath becomes visible and signals that an order has been placed for said article;

(iii) reading said plurality of restocking cards by a container comprising a machine tag reader and generating an order for the article identified; and (iv) transmitting said order to a central stock server comprising a processor and memory units connected to said container, and further transferring said orders to be fulfilled to a fulfillment server, wherein when an employee wishes to order a predetermined quantity of a product the employee removes the restocking card from the article's packaging and presents the restocking card to the container and the container then transmits an order for the quantity and product associated with the restocking card to the central stock server which processes the order and sends it to a fulfillment server.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to an inventory management and fulfillment system for ordering and receiving articles in a supply room of a facility. The term "supply room in a facility" should be understood in a broad sense such as a supply room of a hospital, an individual store within a chain of stores etc. In general, the invention relates to managing multiple, geographically separated inventory locations (supply rooms). The supply rooms can be in different locations or even different rooms in the same building or complex of buildings.

The inventory system is suited to manage inventory of consumable articles, typically ordered in bulk, such as hospital consumables (pads, syringes . . . ), fast food articles (napkins, cups, buns . . . ) etc. Such consumables are typically ordered in bulk by regular employees such as a nurse or fast food employee, and the availability of such articles are important for the quality of service of the establishment in question.

One of the advantages of the system of the invention is that inventory inspection and article ordering can be done quickly and without the use of a computer. An employee entering the supply room inspects the article packagings and can immediately identify articles that have been ordered since the restocking card has been removed from those packagings and a visual cue is visible signaling that the article has been ordered. In order to place an order for an article, the employee does not to log to a computer, identify himself, select an article, select quantity to be ordered, request permission etc. All these actions consume time, require capital investment for the material and require time to train the employee. Errors can also happen more frequently, for example, the employee might select a similar but not identical product on the computer system, typically when many similar product exists (difference in size, material, color etc.). Using the system of the invention, all the employee has to do is remove the restocking tag from the packaging and place it in the container. In this simple action, the employee has placed an order for the right product at the predetermined quantity. Nothing more needs to be done by the employee for placing the order.

First, a plurality of restocking cards is prepared. Each restocking card comprises a machine readable tag, such as a passive Radio Frequency Identification (RFID) tag or any other present or future machine readable tag. Each restocking card is initially configured to identify a predetermined quantity of a predetermined article, for example, 500 pads of a certain size from a certain manufacturer. Any data on the restocking card may be configurable.

The restocking cards of the invention are removably attached to the article packaging they identify. Typically the employee in the supply room visually inspects the article packaging to decide which articles need to be ordered. When the employee determines that a certain article needs to be ordered, the employee removes the appropriate restocking card associated with that article from the article's packaging, and presents that restocking card to a specialized container capable of reading the machine-readable tags on the restocking cards.

When the restocking card is removed, a visual cue previously hidden by the restocking card is now observable on the article packaging to signal that an order has been placed for that article (since the restocking card is no longer there). The visual cue can take any form, as long as it can easily be noticed that the restocking card has been removed. For example, the restocking card can be of one color, and a card of a different color can be placed behind. In this scenario, if the restocking card is say green, a red card can be placed behind it, so when the employee scans the inventory in the supply room he can immediately identify articles that have been ordered (red card visible) and articles that have not been ordered (green card visible). Alternatively, the packaging itself may contain a mark (for example "Article Ordered") that is covered by the restocking card, such that when the restocking card is removed the mark becomes visible. The visual cue can also be null, that is simply the absence of the restocking card, though for a quick visual inspection it is more reassuring to encounter a positive sign (visual cue) that the restocking card has been removed than to deduct so by the absence of the restocking card.

The container comprises a machine-readable tag reader such as an RFID reader or any other present or future machine readable tag. There exist many types of containers of the invention. In some embodiments, the container is a stock box, that is a box into which restocking cards are dropped, and the restocking cards are read, for example, when entering the container. In some embodiments, the container is a stock board into which restocking cards are visibly placed. The restocking cards are read when placed on the stock board. One of the advantages of the stock board compared to the stock box is that it is easy to see which restocking cards are currently on the stock board, thus easily knowing which articles are currently on order and awaiting fulfillment.

A central stock server is connected to the container (via any communication mean, wired, wireless or both) and receives from the container article orders to be fulfilled. The orders are then processed and transferred to a fulfillment server. The fulfillment server can be a central server of the facility which in turn communicates with the right supplier server for placing an order. Alternatively, the fulfillment server can be the supplier server and thus the central stock server is also able to place direct orders with suppliers.

Thus when an employee wishes to order a predetermined quantity of a product, the employee removes the restocking card from the article packaging and presents the restocking card to the container (stock board or stock box, for example). The container reads the machine readable tag of the restocking cards and extracts from it the necessary article information to transmit an order for the quantity and article (product) associated with the restocking card read. The order is transmitted to the central stock server (one or more servers) which processes the order and transmits it to a fulfillment server (one or more fulfillment servers). When an order is fulfilled, the article packaging delivered contains a restocking card for future orders. The restocking card on the delivered article can either be a new restocking card or alternatively the matching restocking card placed in the container can be removed and placed again on the delivered article packaging.

It is possible to confirm the actual fulfillment of the ordered article. In such case, the person delivering the fulfilled product to the supply room verifies that the container is in the state for order fulfillment and presents a stocking card associated with the fulfilled order to the container signaling that an order for a certain quantity of a predetermined article has been fulfilled to the supply room. The restocking card may tell the person not only in which supply room to deliver the order but also in which shelving space within that supply room to place the delivered articles.

The container and the central stock server can communicate via any wired and/or wireless communication means of the art (telephone, Internet, private data lines, public data lines, cellular lines or any combination thereof).

The central stock server can communicate with the fulfillment server either in real time or close to real time where an order received is immediately or very quickly processed and transmitted to the fulfillment server. Alternatively, the central stock server can communicate the orders to the fulfillment server in predetermined points such as: once a day, once the quantity of orders reaches a predetermined threshold etc. The system administrator can configure the ordering system according to the chosen ordering rules selected for each article and/or supplier.

In some embodiments, the container may comprise two states, order placement and order fulfillment: the first state for receiving an order to be fulfilled for a certain quantity of a product, and the second state for signaling (confirming) that such an order for a certain quantity of a product has actually been fulfilled. In some embodiments, when the system is in normal operation, reading a restocking card is interpreted as placing an order for the article and quantity encoded in the restocking card. When a specialized button is pressed (such as a stock button or switch), then any restocking card read is interpreted as fulfillment of the article and quantity encoded in the card. Thus when an article packaging is delivered to the supply room, it is possible to read its restocking card by the container (placed in fulfillment state) in order to confirm to the supplier that the order has successfully reached the right supply room.

In some embodiments, it may be useful to be able to place an urgent order to be delivered as soon as possible as opposed to the normal delivery delay. This can be achieved in several ways. In one way, a second restocking card is removably attached to the article packaging to signify urgent delivery. The second restocking card is different from the first restocking card, for example, by being in a different color and/or having different text/graphical markings ("urgent" etc.). The visual cue behind the second restocking card is preferably different than the first visual cue so that an employee looking at the article packaging can immediately understand that an urgent order has been placed. Alternatively, the first restocking card can be used for urgent orders, by pressing an urgent switch on the container to signal that the next restocking card read should be interpreted as an urgent order. This last solution has two disadvantages: (1) the container needs to be more sophisticated to enable urgent orders which will make the container more expensive to produce and possibly more error prone as the employee may or may not press the urgent button when necessary; (2) when inspecting the article package, the visual cue will not tell the employee if the order placed was urgent or not.

Figure 1:
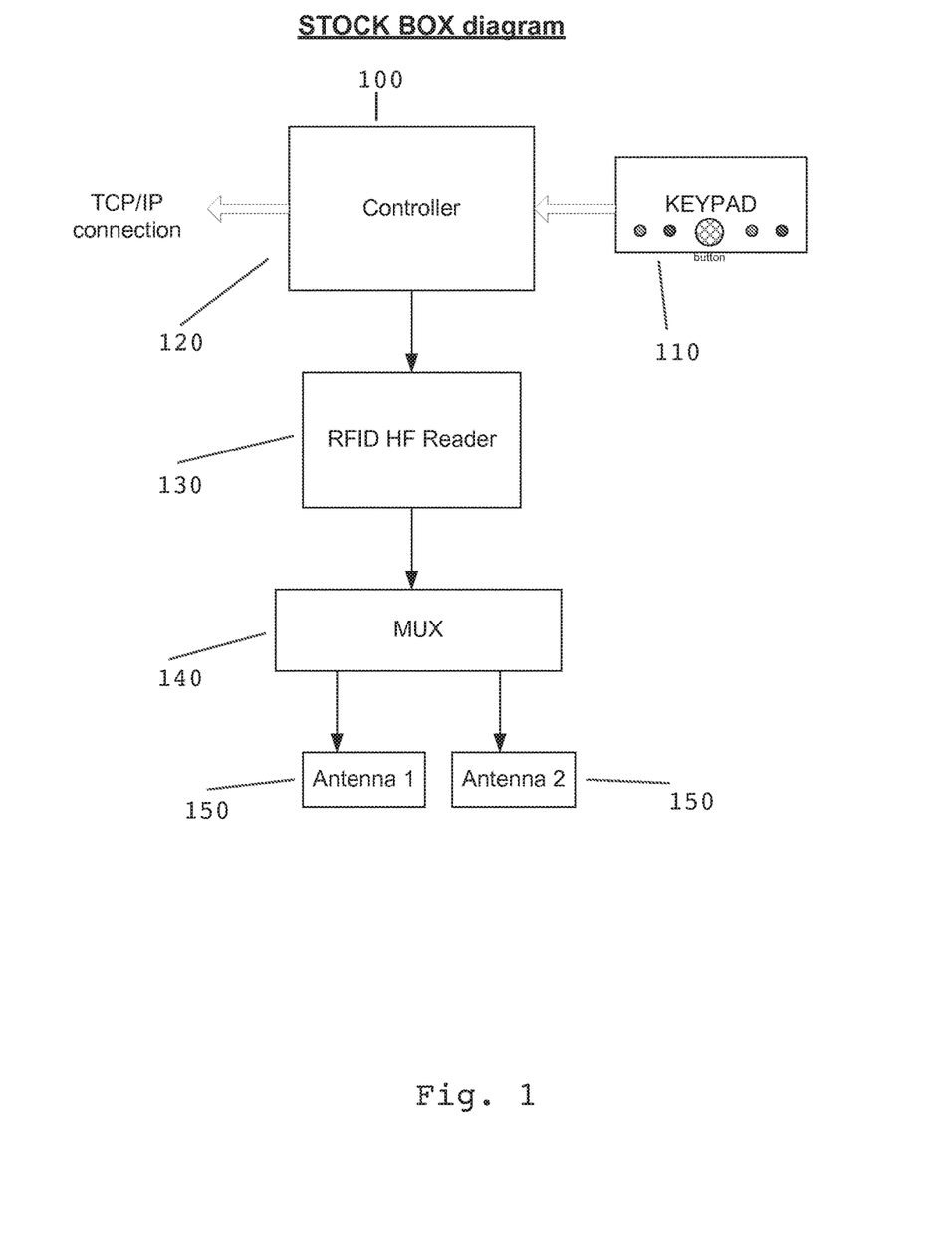
FIG. 1 shows a block diagram of a stock box system.

Reference is now made to FIG. 1 showing a block diagram of a typical Stock Box container 100. A keypad 110 with optional visual signs, such as a LED or switch with at least two positions, is used to place the container either in a state for placing orders when reading a restocking card or in a state for signaling order fulfillment when reading a restocking card (not shown). The keypad is connected to a controller 120 which in turn is connected to a machine readable tag reader 130. The machine readable tag reader can be a Radio Frequency Identification (RFID) reader, such as an RFID high-frequency (HF) reader, that is an RFID reader in the 13.56 Mhz frequency. The controller 120 is connected via the machine tag reader 130 to a multiplexer (MUX) 140 which in turn operates a one or more antennas 150. Although only 2 antennas 150 are shown, for illustration, the actual number of antennas 150 used does not have any limit.

The controller 120 also has communication capabilities such as TCP/IP, WiFi GPRS, UMTS and any existing or future communication protocol are considered to be encompassed by the invention.

Figure 2:
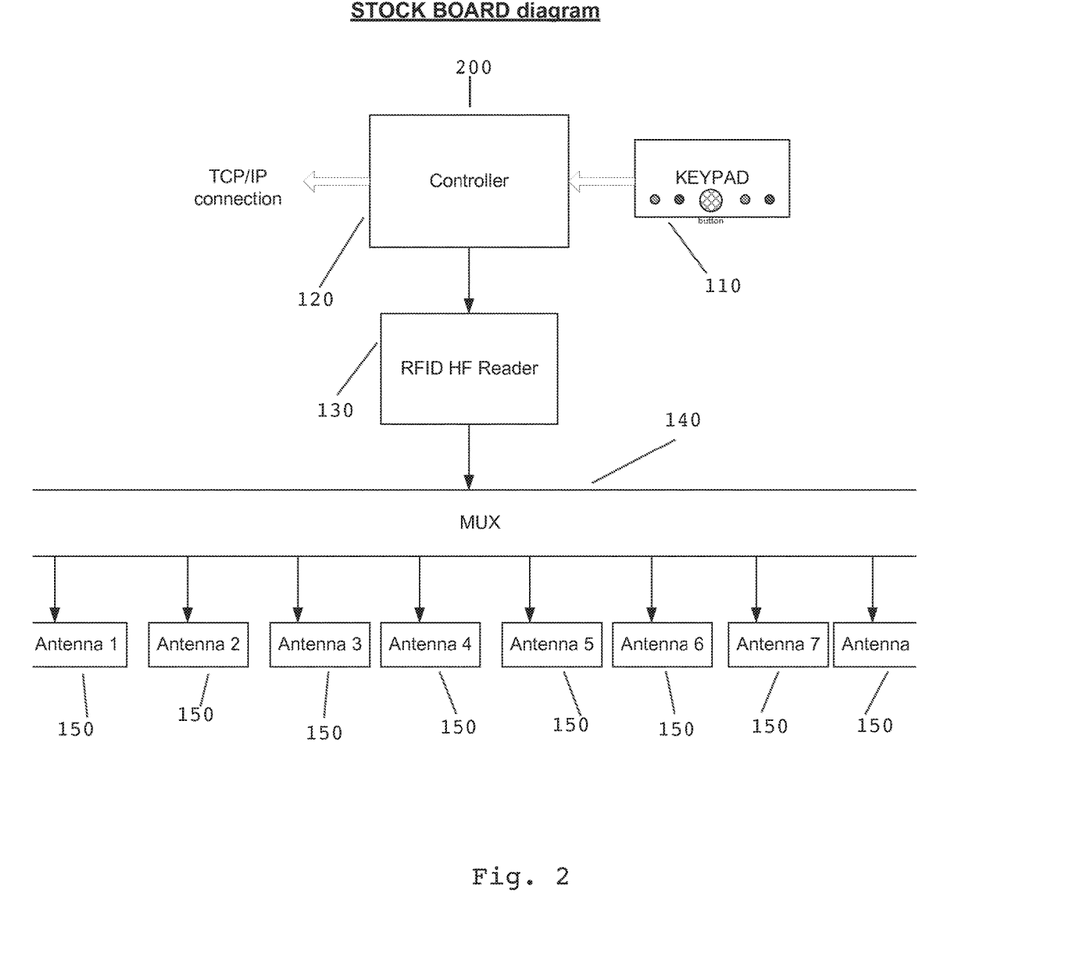
FIG. 2 shows a block diagram of a stock board system.

Reference is now made to FIG. 2 showing a block diagram of a typical Stock Board container 200. Schematically the Stock Box 100 and the Stock Board 200 share the same basic design. However, the stock Box 100 does not provide a visual view of the ordered items, while the Stock Board 200 enables the user to immediately and conveniently see that an article has been ordered by scanning the Stock Board 200 (as opposed to scanning all the article packages for visual cues). It is possible to enable visual viewing of ordered articles in a Stock Box 100, when a monitor is attached to the stock box 100, though such an implementation would increase the price point of the Stock Box 100.

Figure 3:
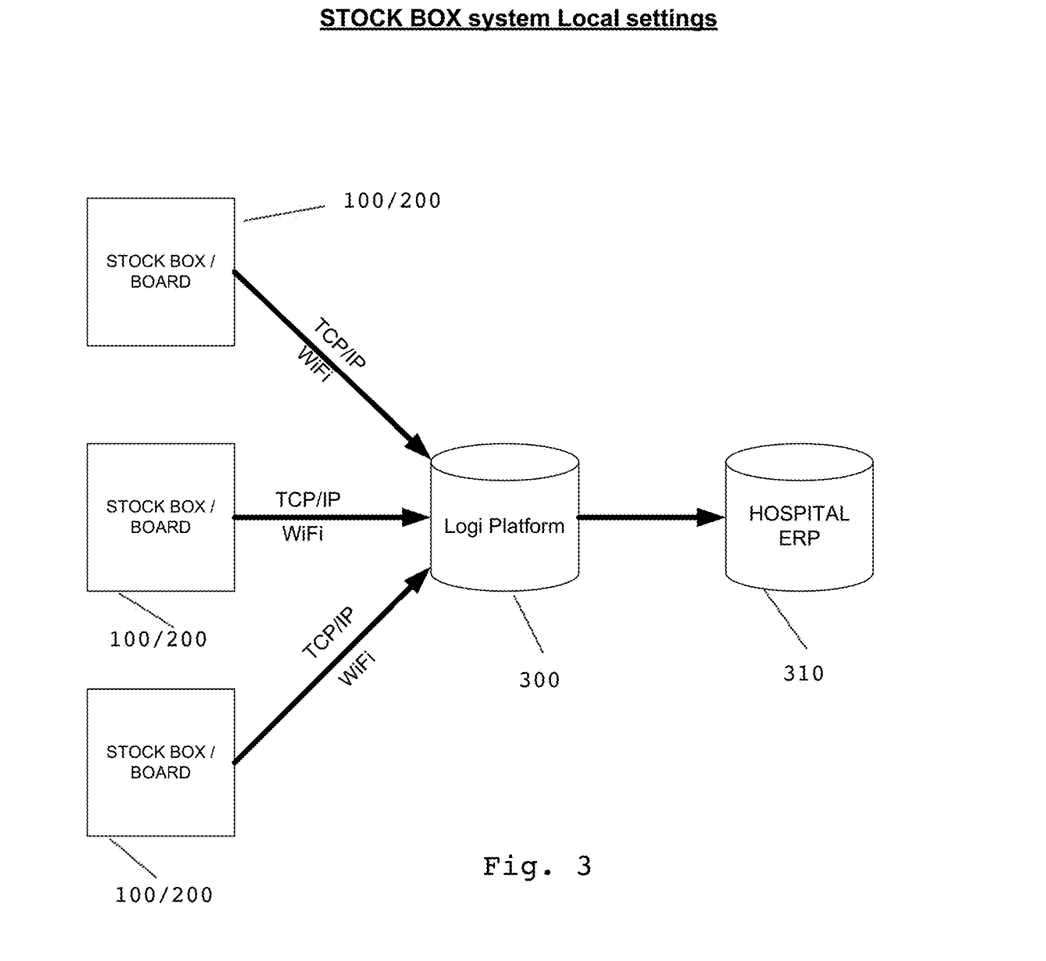
FIG. 3 shows a block diagram of a stock box system local settings.

Reference is now made to FIG. 3 showing a block diagram to a Stock Box system's local settings. A plurality of Stock Boxes 100 and/or Stock Boards 200 is connected via wired and/or wireless communication lines to a central stock server 300 of the invention (shown in FIG. 3 as "Logi Platform"). The central stock server 300 is connected in turn the fulfillment server 310 (shown in FIG. 3 as "HOSPITAL ERP"). In a local setting, all the Stock Boxes 100 and Stock Boards 200 are connected to a central stock server 300 on the premises of the facility via wired and/or wireless lines.

Figure 4:
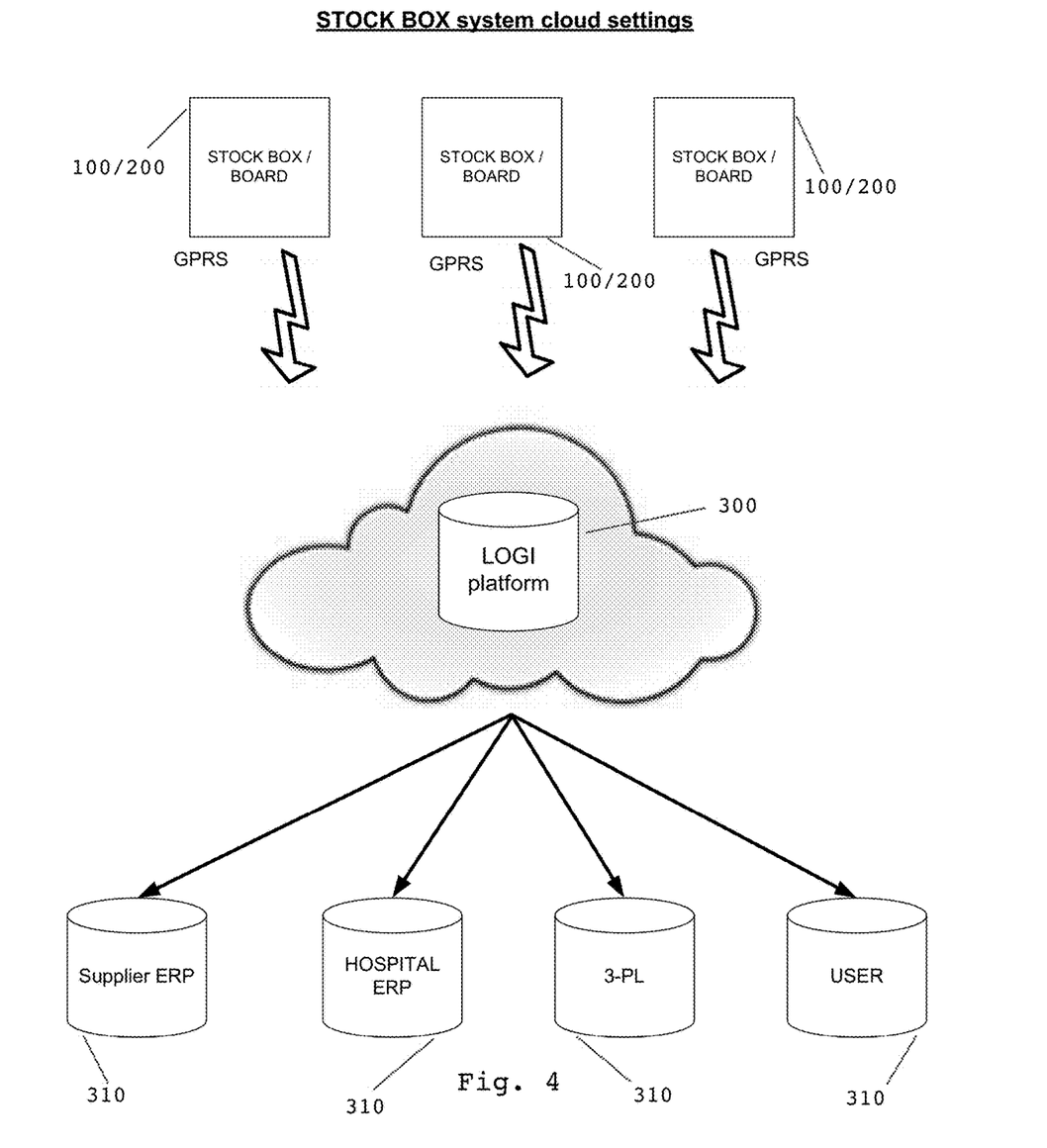
FIG. 4 shows a block diagram of a stock box system cloud settings.

Reference is now made to FIG. 4 showing a block diagram of a Stock Box\Stock Board system cloud settings, where Stock Boards 100 and Stock Boxes 200 connect to the central stock server 300 over the Internet or any other public or private network. A plurality of containers (Stock Box 100 and/or Stock Boards 200) is connected via wireless and/or wired communication lines such as GPRS, WiFi (with an open port to the internet), UMTS etc. to the Internet and via the Internet to the central stock server 300 (shown as "LOGI Platform") which in turn is connected to fulfillment servers 310 (shown as "HOSPITAL ERP", "HOSPITAL ERP", "3-PL" (third party logistics), and "USER"). The concept is to provide the ability to offer services on demand based on Software As A Service (SAAS). In this configuration the system is able to work with a plurality of different fulfillment servers 310.

Figure 5:
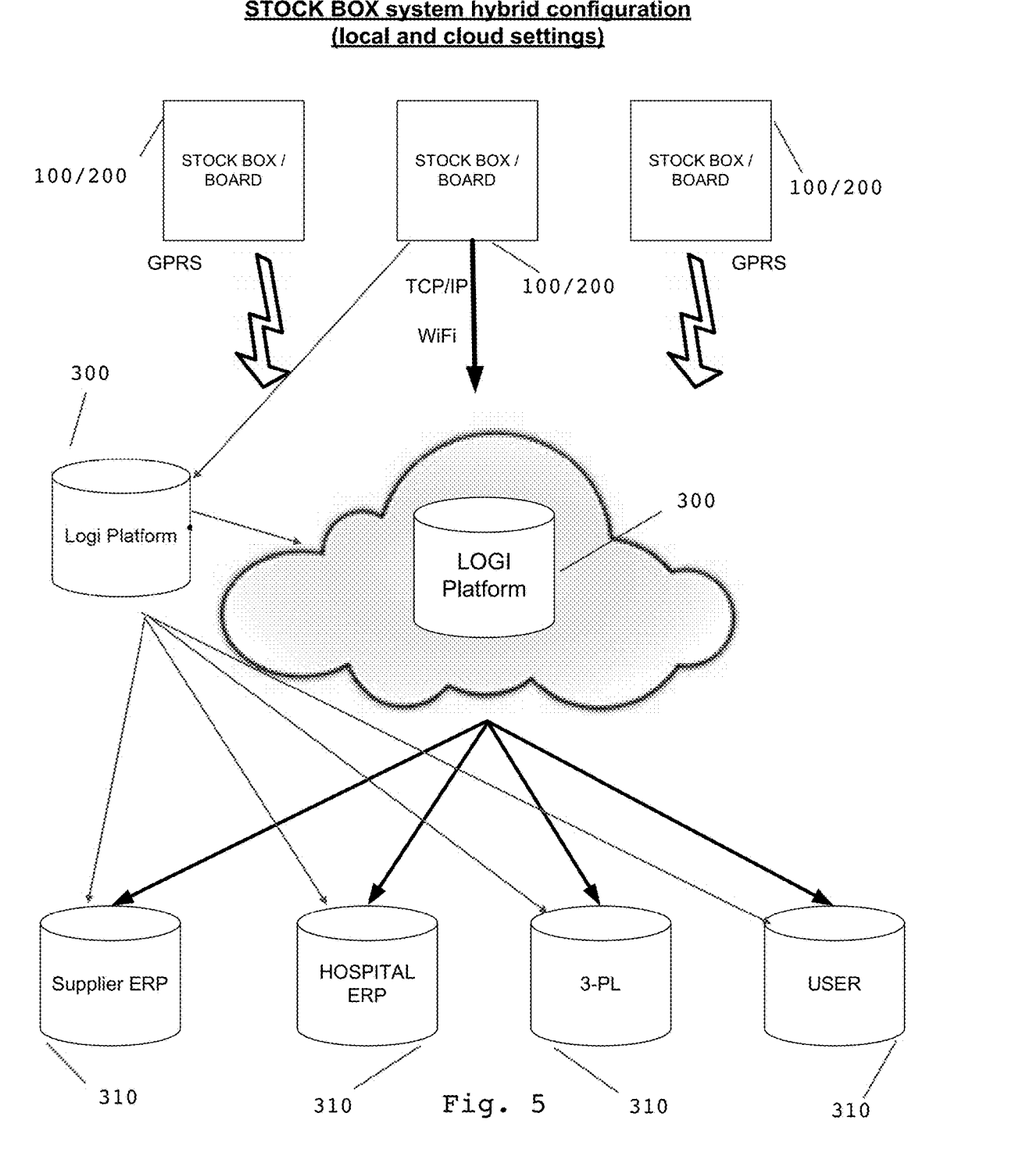
FIG. 5 shows a block diagram of a stock box system hybrid configuration (local and cloud settings).

Reference is now made to FIG. 5 showing a block diagram of a stock box system hybrid configuration (local and cloud settings). A plurality of containers (Stock Box 100 and/or Stock Boards 200) is connected via both local and cloud (Internet) control system. These configurations provide solutions where part of the replenishment is done by the local organization warehouse and part of the replenishment is done by the supplier or logistic centers directly. The connection is done via wireless (or wired) communication lines to the central stock server 300 (shown as "LOGI Platform") on the Internet. The central stock server 300 is connected to fulfillment servers 310 (shown as 'Supplier ERP", "HOSPITAL ERP", "3-PL" (third party logistics), and "USER").

In some embodiments the containers 100/200 can be connected to more than one central stock server 300.

In some embodiments, each restocking card further comprises one or more of the following items: article name, number of units to be ordered, manufacturer name, catalog number, storage location in the supply room, barcode, article description and photo of article. Any such item can be configured and edited. New items can be added as required.

The central stock server 300 can also produce multiple inventory reports about the orders processed and articles that have been replenished.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A system for ordering and receiving consumable articles in a supply room of a facility, the system comprising:
   (i) a plurality of restocking cards, each restocking card comprising a machine readable tag, and configured to be removably attached to consumable article packaging and identify a predetermined ordering quantity of said consumable article, said consumable article being stored in a supply room of a facility;
   (ii) a plurality of visual cues placed underneath said plurality of stocking cards on said consumable article packaging such that when a restocking card is removed, the visual cue underneath becomes visible and signals that an order has been placed for said consumable article;

(iii) a container in said supply room, comprising a machine tag reader for reading said plurality of restocking cards; and (iv) a central stock server comprising a processor and memory units connected to said container for receiving orders to be fulfilled from the container and transferring said orders to be fulfilled to a fulfillment server, wherein when an employee wishes to order a predetermined quantity of consumable article in the supply room, the employee removes the restocking card from said consumable article's packaging and presents the restocking card to the container, the container then transmits an order for the quantity and consumable article associated with the restocking card to the central stock server which processes the order and sends it to a fulfillment server.

2. The system according to claim 1, wherein said machine readable tag is a passive Radio Frequency Identification (RFID) tag.

3. The system according to claim 1, wherein the container comprises two states: one for receiving an order to be fulfilled for a certain quantity of a consumable article, and the other for signaling that an order for a certain quantity of a consumable article has been fulfilled.

4. The system according to claim 3, wherein when an order is fulfilled the person delivering the fulfilled consumable article to the supply room verifies that the container is in the state for order fulfillment and presents a stocking card associated with the fulfilled order to the container confirming that an order for a certain quantity of a predetermined consumable article has been fulfilled to the supply room.

5. The system according to claim 1, wherein the container is a stock box adapted to withholding a plurality of restocking cards inside the box.

6. The system according to claim 1, wherein the container is a stock board adapted to visibly holding a plurality of restocking cards on the board.

7. The system according to claim 1, wherein the container is connected to the central stock server via a wired or wireless connection or both.

8. The system according to claim 1, wherein the person delivering the fulfilled consumable article to the supply room first identifies himself before presenting the restocking card to the container.

9. The system according to claim 1, wherein each restocking card further comprises one or more of the following items: article name, number of units to be ordered, manufacturer name, catalog number, storage location in the supply room, barcode, article description and photo of article.

10. The system according to claim 1, wherein the fulfillment server sends orders to a facility server and the facility server sends the orders to the appropriate suppliers.

11. The system according to claim 1, wherein the container further comprises a monitor for displaying the contents of a read restocking card.

12. The system according to claim 1, further comprising a second restocking card to signal an urgent order of an article.

13. A method for ordering and receiving consumable articles in a supply room of a facility, the method comprising the steps of:

(i) configuring a plurality of restocking cards each to identify a predetermined quantity of a predetermined consumable article in a supply room of a facility, each restocking card comprising a machine readable tag and configured to be removably attached to consumable article packaging and identify a predetermined ordering quantity of said consumable article;

(ii) placing a plurality of visual cues underneath said plurality of stocking cards on said consumable article packaging such that when a restocking card is removed, the visual cue underneath becomes visible and signals that an order has been placed for said consumable article (iii) reading said plurality of restocking cards by a container in the supply room comprising a machine tag reader and generating an order for the consumable article identified; and (iv) transmitting said order to a central stock server comprising a processor and memory units connected to said container, and further transferring said orders to be fulfilled to a fulfillment server, wherein when an employee wishes to order a predetermined quantity of a consumable article the employee removes the restocking card from the consumable article's packaging and presents the restocking card to the container and the container then transmits an order for the quantity and consumable article associated with the restocking card to the central stock server which processes the order and sends it to a fulfillment server.

* * * * *